July 11, 1939.  J. BURTON  2,165,221
SCAFFOLDING CLAMP
Filed Dec. 24, 1936  6 Sheets-Sheet 1
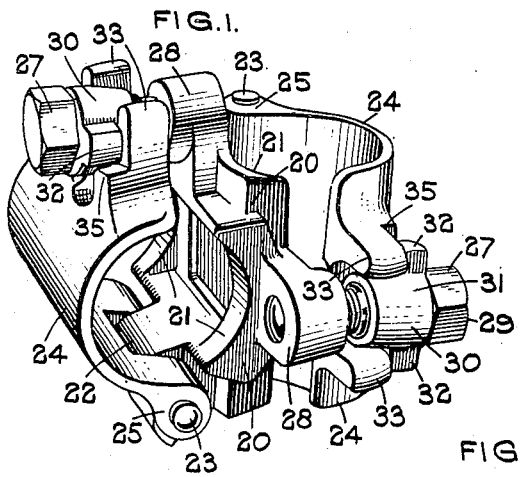
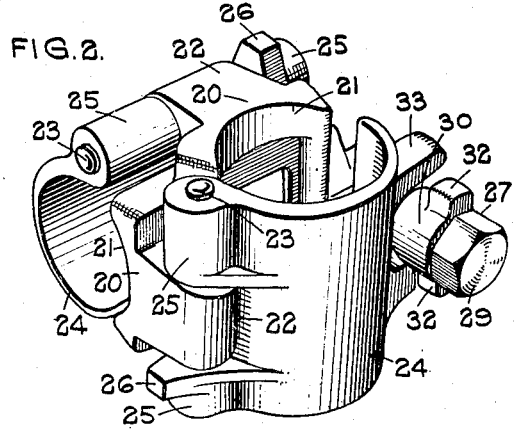
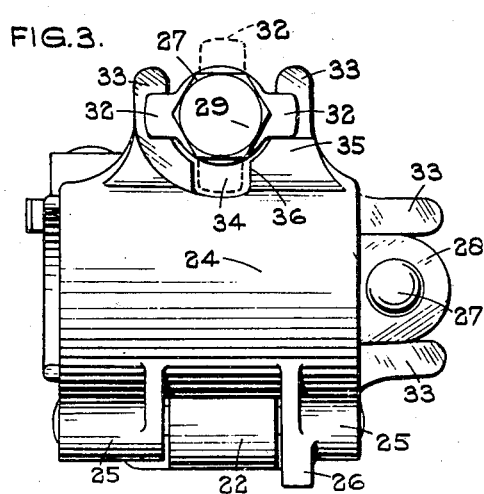
Inventor
JOHN BURTON,
BY
Attorneys July 11, 1939.   J. BURTON   2,165,221
SCAFFOLDING CLAMP
Filed Dec. 24, 1936   6 Sheets-Sheet 2
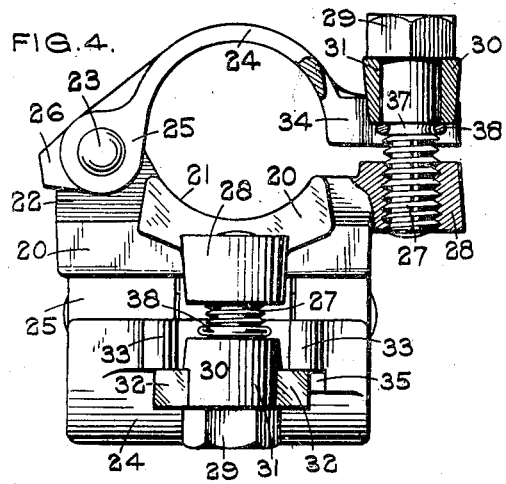
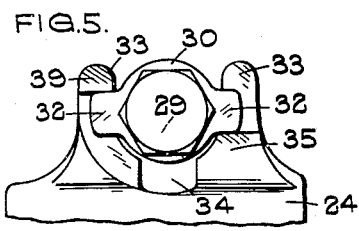
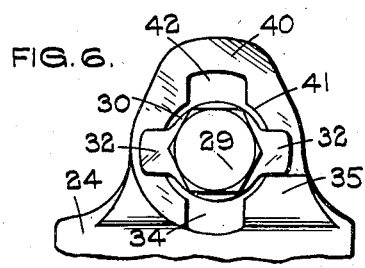
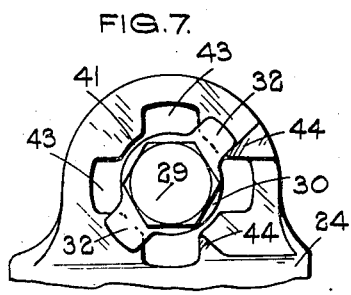
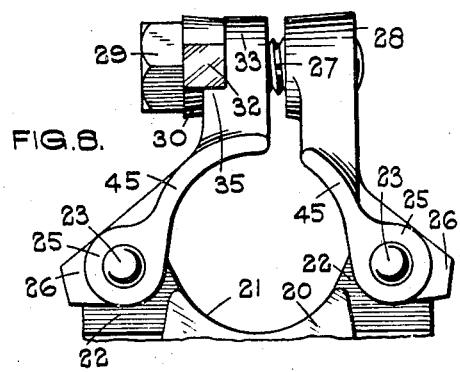
Inventor
JOHN BURTON,
By
Attorneys

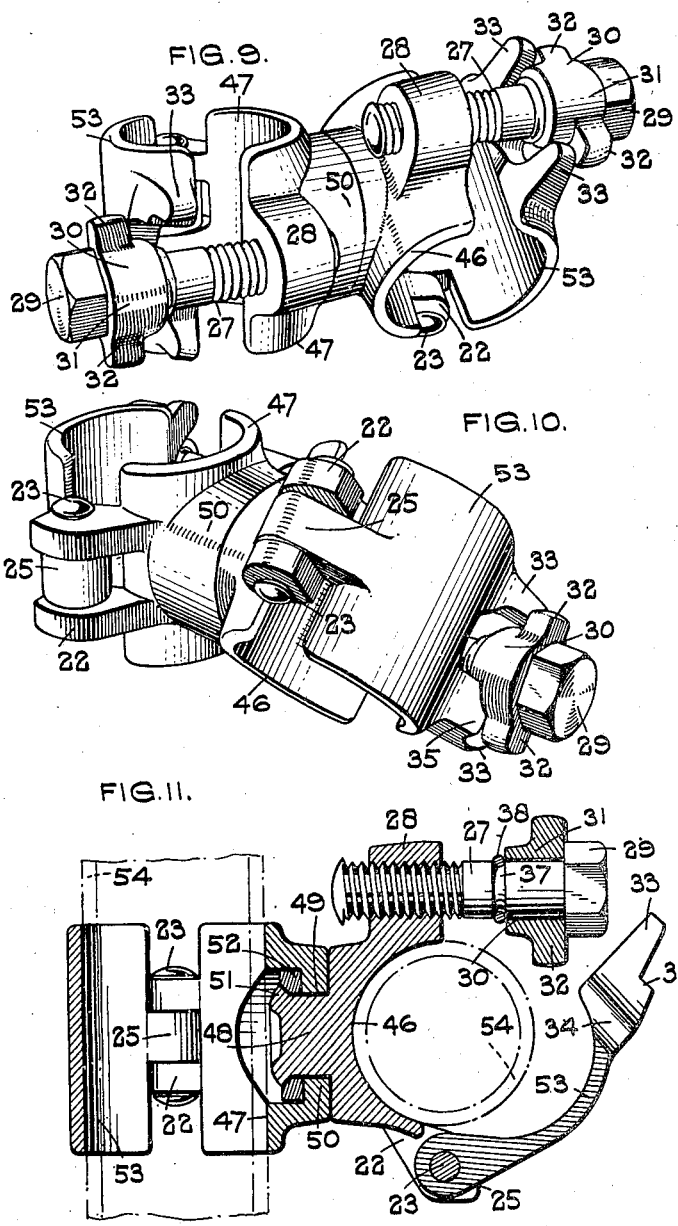

July 11, 1939.  J. BURTON  2,165,221
SCAFFOLDING CLAMP
Filed Dec. 24, 1936  6 Sheets-Sheet 5

Inventor
JOHN BURTON,
Attorneys

July 11, 1939.  J. BURTON  2,165,221
SCAFFOLDING CLAMP
Filed Dec. 24, 1936   6 Sheets-Sheet 6

Inventor
JOHN BURTON,
By
Attorneys

Patented July 11, 1939

2,165,221

UNITED STATES PATENT OFFICE 2,165,221

SCAFFOLDING CLAMP

John Burton, Edgbaston, Birmingham, England

Application December 24, 1936, Serial No. 117,590
In Great Britain July 3, 1936

14 Claims. (Cl. 304—40)

This invention relates to scaffolding clamps for use in the erection of scaffolding and like temporary structures, and is concerned with clamps of the kind comprising a plurality of jaws or portions associated together for movement towards and away from each other, the jaws or portions being adapted to engage one or more scaffolding members, such as a standard or putlog, suitable clamping means being provided for securing the jaws or portions relative to each other so that they are in gripping engagement with the scaffolding member.

The primary object of the present invention is to provide a construction of clamping means by which the jaws or portions can be secured very rapidly in gripping engagement with the scaffolding member and can be released with equal rapidity when it is desired to remove the scaffolding member and without subjecting the parts of the clamp to unnecessary bending stresses.

Other objects of the invention will become apparent from the following description of the invention.

Referring to the drawings:

Figure 1 is a perspective view of one form of scaffolding clamp constructed in accordance with this invention and adapted to connect two scaffolding members together in fixed angular relationship.

Figure 2 is a further perspective view of the same construction taken from the opposite side.

Figure 3 is a side elevation of the construction shown in Figure 1.

Figure 4 is an end elevation taken partly in section showing the same construction.

Figures 5, 6 and 7 are detail views corresponding to Figure 3 showing three slight modifications of this construction.

Figure 8 is a detail view corresponding to Figure 4 showing a further modification.

Figure 9 is a perspective view of a further form of scaffolding clamp constructed in accordance with this invention and adapted for connecting two scaffolding members together in varying angular relationship.

Figure 10 is a perspective view of the same construction taken from the opposite side.

Figure 11 is a cross sectional view again of the same construction.

Figure 12:
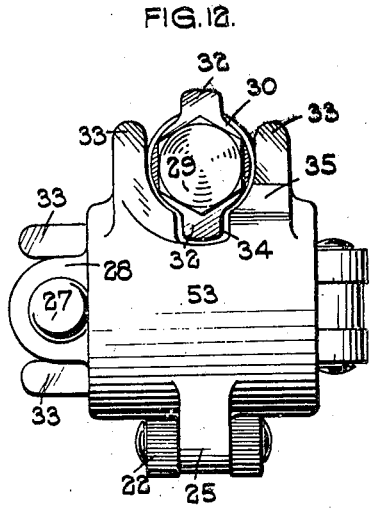
Figure 12 is a side view of the construction shown in Figure 9.
Figure 13:
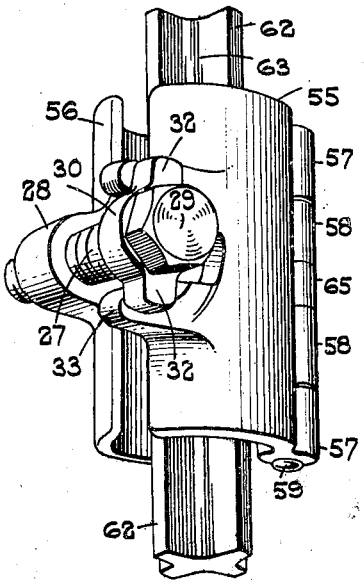
Figure 13 is a perspective view of a further form of scaffolding clamp constructed in accordance with this invention adapted to connect two scaffolding members in end to end relationship.
Figure 14:
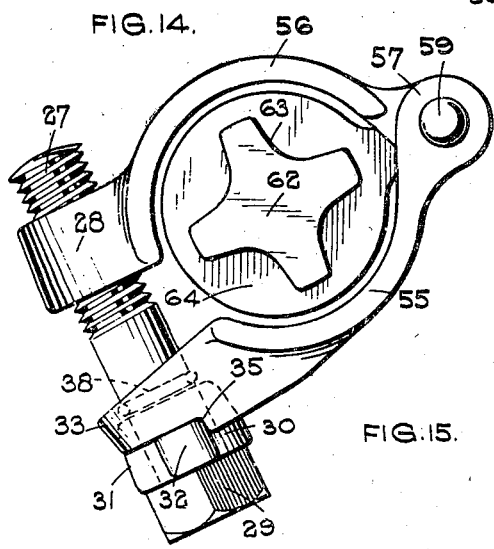
Figure 14 is an end view of the same construction.
Figure 15:
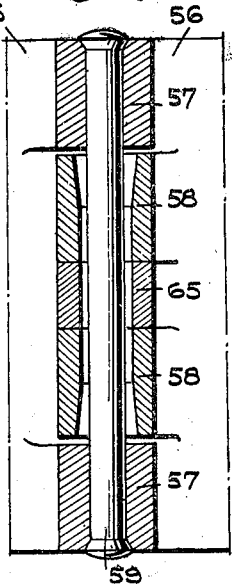
Figure 15 is a detail cross sectional view of the construction shown in Figure 13.
Figure 16:
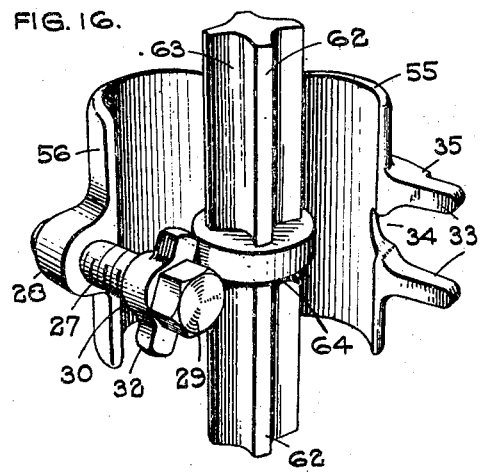
Figure 16 is a further perspective view of the same construction showing the two jaw portions open to illustrate the interior of the clamp.

Referring to Figures 1 to 4 of the drawings, the scaffolding clamp there illustrated is adapted to secure two scaffolding members together at right angles to one another and in fixed angular relationship, and this clamp comprises a central block 20 provided on opposite sides with integral arcuate jaw portions 21 disposed transversely of one another, the shape of the block being thus similar to that of a Maltese cross.

Each of the arcuate jaw portions is provided centrally at one side with an integral hinge lug 22 as shown in Figure 2, each lug carrying a hinge pin 23 to the ends of which are connected pivotally one of a pair of arcuate jaws or caps 24 provided at one end with a pair of spaced integral hinge lugs 25 through which the two ends of each of the hinge pins 23 extend, and these jaws or caps are adapted to cooperate with the corresponding arcuate jaw portions of the central block in securing the two scaffolding members together in the known manner.

For limiting the pivotal movement of each cap 24 in relation to the central block, one of its hinge lugs 25 is provided with an integral lug or stop 26 extending radially therefrom and adapted to engage the adjacent end of the opposite arcuate jaw portion of the central block.

With the present invention, the clamping means for securing the jaws or caps 24 in clamping engagement with their corresponding scaffolding members comprises clamping members in the form of screws or bolts 27 which screw into bosses 28 provided medially at the sides of the said arcuate jaw portions 21 which are opposite to the hinge lugs 22.

In accordance with the present invention, each screw or bolt 27 carries adjacent the head 29 thereof a locking member 30 mounted pivotally on the screw or bolt, and each locking member conveniently comprises a cylindrical hollow portion 31 tapered externally in a direction towards the free end of the bolt, and the cylindrical portion 31 is provided integrally on opposite sides of the locking bolt with one of a pair of arms or abutments 32 which are thus arranged diametrically with respect to each other.

Each of the arms 32 is adapted to engage one of a pair of abutments provided on the adjacent free or unhinged end of the corresponding pivoted jaw or cap 24, and these abutments are conveniently constructed in the form of flanges or ears 33 which project laterally from the free end of their corresponding jaw so that they extend on opposite sides of the adjacent locking bolt, while between the inner ends of each pair of ears the free end of the jaw is recessed in a direction towards the hinge thereof as indicated at 34 in Figure 3.

With the above construction, when it is desired to secure two scaffolding members together, each locking member 30 is turned until its arms 32 are in the dotted position indicated in Figure 3, whereupon the caps 24 can be pivoted into loose engagement with the scaffolding members, and the locking members turned through 90° to the position actually shown in Figure 3, so that their arms engage the outer faces of the adjacent ears 33, whereupon the locking bolts can be screwed up and clamping pressure applied through the locking members onto the ears to pivot the caps inwardly into engagement with their corresponding scaffolding members.

When it is desired to remove the scaffolding members the locking bolts are unscrewed until the pressure between the locking members and the caps is removed, whereupon the locking members can be turned on their bolts through 90° into the dotted position indicated in Figure 3, wherein they are no longer in engagement with the ears and the caps can be pivoted past the locking members and the bolt heads to permit of the scaffolding members being removed; such pivotal movement being facilitated by the provision of the recesses 34 between the inner ends of the pins which allow the free ends of the caps to move past the adjacent arm of the locking members.

With such a construction, when it is desired to secure or to release the scaffolding members, it is necessary to screw up or unscrew the locking bolts through only a very limited distance as as soon as the pressure between the locking member and the adjacent cap has been removed the locking member can be turned on the bolt to permit of the cap being pivoted and the scaffolding member removed.

The construction in accordance with the present invention possesses the advantage therefore as compared with constructions in which no locking member is provided, that clamping and release of the scaffolding members can be effected in the minimum of time and without the necessity for removing the locking bolts from the central block.

Further, by providing each locking member on opposite sides of the corresponding bolt with the arms 32 which are adapted to engage the ears 33 on opposite sides of the bolt, during clamping and when the scaffolding member is secured in position, the bolt is subject to a longitudinal force only, and appreciable transverse force or pressure on the bolt is avoided, so that there is little likelihood of the bolt becoming bent or wedged in relation to the central block.

With the above construction, for preventing the locking member turning on the bolt on screwing the latter up to apply clamping pressure to the scaffolding member, and the arms moving out of engagement with the ears, the right-hand ear when the clamp is viewed in side elevation, as shown in Figure 3, is provided adjacent its inner end with an integral outwardly extending lug or stop 35 adapted to engage one side of the adjacent locking arm as shown in this figure, and such lug or stop conveniently extends up to the side of the adjacent recess 34 to provide an abutment face 36 for engaging the other arm of the locking member when the latter is turned into the dotted release position, so that it serves to locate the locking member in a position in which the cap can be pivoted freely past the locking member.

In order to locate each locking member against longitudinal movement in relation to its locking bolt and thus ensure that the locking member will be in the correct position on the bolt when it is desired to secure the scaffolding members in place, each bolt is, as shown in Figure 4 provided with an annular recess 37 within which is disposed a split ring or circlip 38 adapted to engage the inner face of the locking member and maintain this adjacent the bolt head when the locking member is in the release position.

Instead of providing the stop 35 for limiting the pivotal movement of the locking member upon the inner end of the right-hand ear, shown in Figure 3, such stop may be provided on the outer end of the left-hand ear, or alternatively, it may be so provided on both ears as indicated at 35 and 39 in Figure 5.

In order to increase the strength of the free end of the jaws or caps 24, where these are engaged by the locking member, the ears of each jaw or cap may, as shown in Figure 6, be extended and their free ends connected by a bridge-piece 40, so that the free end of the jaw as a whole is of part circular configuration, the part circular portion having an opening 41 through which the locking bolt extends and adjacent the bridge-piece the opening may be formed with a recess 42 similar to the recess 34 to provide the necessary clearance between the arms of the locking member and the jaw or cap when the locking member is in the release position.

The arrangement of the recesses 34 and 42 may be that shown in Figure 6, in which the locking member when in the release position extends transversely of the scaffolding member, or the position of the recesses may be at right angles to that illustrated in Figure 6, so that the locking member when in the release position extends parallel to the adjacent scaffolding member.

Alternatively, as shown in Figure 7, each opening 41 may be provided with four recesses 43 arranged at right angles to one another, and with such an arrangement the pivotal movement necessary to move the locking member from the release to the clamping position or vice versa is a movement of only 45° as compared with one of 90° of the preceding constructions, so that clamping or release can be effected still more rapidly.

With the construction shown in Figure 7 for limiting the clamping movement of the locking member, the free end of the jaw or cap is provided with an integral stop or lug indicated at 44.

In Figure 8 is shown a further modification of the preceding construction in which, instead of providing a single pivoted cap 24 for co-operating with the adjacent arcuate jaw portion 21, a pair of caps 45 are provided, each pivoted to the central block adjacent opposite ends of the arcuate jaw portions, and clamping means similar to the clamping means shown in Figures 1 to 4, or if desired similar to the clamping means shown in Figures 5 to 7, are provided for securing the free or unpivoted ends of the two caps together and in clamping engagement with the scaffolding member.

Referring now to the construction shown in Figures 9 to 12 of the drawings, the scaffolding clamp there shown is adapted to connect two scaffolding members together in such a manner that the angle between the scaffolding members can be varied. For example, the members may be parallel, or they may be disposed at varying inclinations to one another.

To permit of this, in this construction the clamp comprises a pair of arcuate jaw portions 46, 47 each adapted to embrace partially one of the two scaffolding members, and these jaw portions are connected pivotally together by providing the portion 46 with an integral shank 48 which extends through an opening 49 provided on a boss 50 formed integrally with the other jaw portion, the outer end 51 of the shank being upset or riveted over to secure the two jaw portions together, and a washer 52 being provided between the outer end and the inner face of the said boss 50 to facilitate pivotal movement between the two portions.

Each of the jaw portions 46, 47 carries a further jaw portion or cap 53 hinged thereto and adapted to co-operate with the corresponding jaw portion in connecting together the scaffolding members which are indicated diagrammatically at 54 in Figure 11, and for securing the jaws or caps 53 in clamping engagement with the scaffolding members the clamp is provided with clamping means constructed exactly as shown in Figures 1 to 4 of the preceding constructions, clamping and release of the caps 53 being effected in the rapid manner already described.

Referring now to the construction shown in Figures 13 to 17, the scaffolding clamp there shown is adapted to connect two scaffolding members in end to end relationship, and for this purpose the clamp comprises a pair of jaws 55, 56 of substantially semi-cylindrical shape connected pivotally together by providing the jaw 55 at opposite ends with one of a pair of integral hinge lugs 57 between which are disposed a pair of spaced hinge lugs 58 formed integrally with the other jaw, the lugs being secured in alignment with one another by a hinge pin 59 which extends longitudinally of the clamp.

Figure 17:
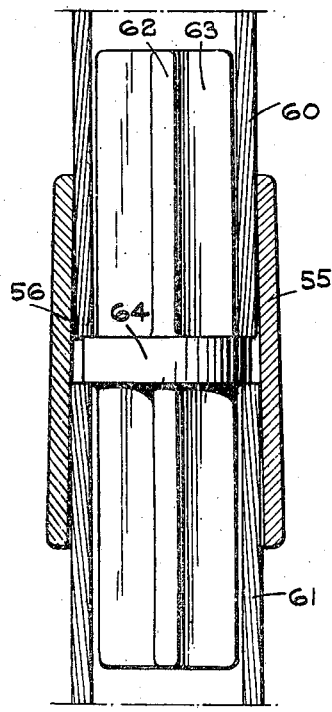
Figure 17 is a sectional view of the same construction with the parts in the clamping position.

The construction illustrated is intended for securing together scaffolding members which are in the form of hollow tubes as indicated at 60, 61 in Figure 17, and for positioning the tubes in relation to the clamp prior to securing them together, the clamp is provided with a joint pin 62 opposite ends of which are adapted to extend into the adjacent end of the two tubes and to engage the interior thereof, the joint pin being recessed or fluted as indicated at 63 to reduce the weight of the clamp.

The joint pin is provided centrally with an integral collar or abutment 64 adapted to space apart the adjacent end of the two tubes, and this collar is provided at one side with an integral hinge lug 65 which is mounted on the hinge pin 59 between the aforesaid spaced hinge lugs 58 associated with the jaw 56.

In order to secure the two scaffolding members rigidly together, it is necessary that the two jaws should grip firmly both scaffolding members, but it is found in practice that unavoidable variations in the external diameters and even shapes of the members may occur. For example, the exterior of one member may be truly cylindrical, while the other member may have an exterior which is slightly oval, and with the present construction in order to ensure that both scaffolding members are gripped securely by the jaws, clearance is provided between the hinge pin and the interior of the hinge lugs 58 associated with the jaw 56, and also between the hinge pin and the interior of the lug 65 to which the joint pin is secured, such clearance being shown in Figure 15, and as a result a limited rocking movement is permitted between the jaw 55 and the jaw 56, and also between the joint pin 62 and the jaw 56.

Thus, when the clamp is employed for connecting a pair of scaffolding members, the adjacent ends of which differ either in external diameter or in external shape, the jaw 56 and also the joint pin 62 are able to tilt longitudinally in relation to the jaw 55 so that both scaffolding members can be securely engaged.

Instead of providing clearance between the hinge pin and the hinge lugs 58 and 65, it may be provided instead between the pin and the hinge lugs 57 which are associated with the jaw 55.

For securing the two jaws in clamping engagement with the ends of the two scaffolding members which are being connected, the clamp is provided with clamping means constructed in a manner exactly similar to the clamping means shown in Figures 1 to 4 of the preceding constructions, so that as in the case of the preceding constructions, clamping and release of the scaffolding members can be effected very rapidly.

With the present construction when it is desired to secure two tubular scaffolding members in end to end relationship, the adjacent ends of these are placed over the ends of the joint pin 62 until the ends abut the opposite sides of the collar or abutment 64, whereupon the jaws are pivoted into clamping position and the clamping means operated to apply clamping pressure to the scaffolding members.

It should be understood that with the constructions shown in Figures 9 to 17, instead of employing clamping means constructed as shown in Figures 1 to 4, such clamping means may be constructed as shown in Figures 5 to 7.

Further, with the construction shown in Figures 9 to 12, instead of employing a single pivoted cap 53 to co-operate with each arcuate jaw portion in securing the scaffolding members together, a pair of pivoted caps may be provided connected pivotally to the arcuate jaw portions at opposite sides, the free ends of the caps being connected together by clamping means in accordance with the present invention, and in a manner similar to the construction shown in Figure 8.

With any of the above constructions, the length of the locking bolts and of the bosses through which these bolts extend may be such that on unscrewing the locking bolts into a position in which the locking member can be pivoted to the release position, the bolts still engage the bosses over a length sufficient to maintain them securely in position so that they may if desired be connected removably to these bosses, and in the event of the bolts fracturing they can be readily replaced.

Further, with the construction shown in Figures 1 to 5 and 8 to 17, the ears with which the locking member engages may extend right up to the sides of the caps and form part of the usual flange of the latter.

It should be understood that the application of the invention is not limited to scaffolding clamps constructed as illustrated. It may for instance be applied also to double-gripping scaffolding clamps constructed as described in U. S. A. Patent No. 2,020,102, or to clamps constructed as described in U. S. A. Patent No. 2,060,171, while instead of applying the invention to a clamp for securing two tubes in end to end relationship, as shown in Figures 13 to 17, it may be applied similarly to a clamp for securing a single tube to a masonry wall or like structure.

Figure 18:
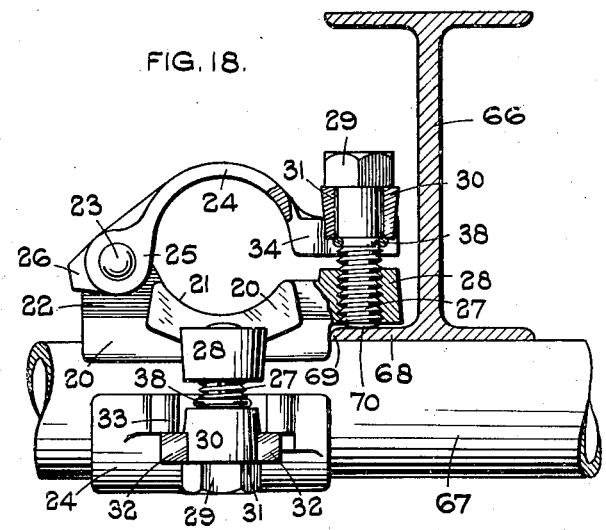
Figure 18 is a side elevation illustrating a modified application of the construction shown in Figures 1 to 4.
Figure 19:
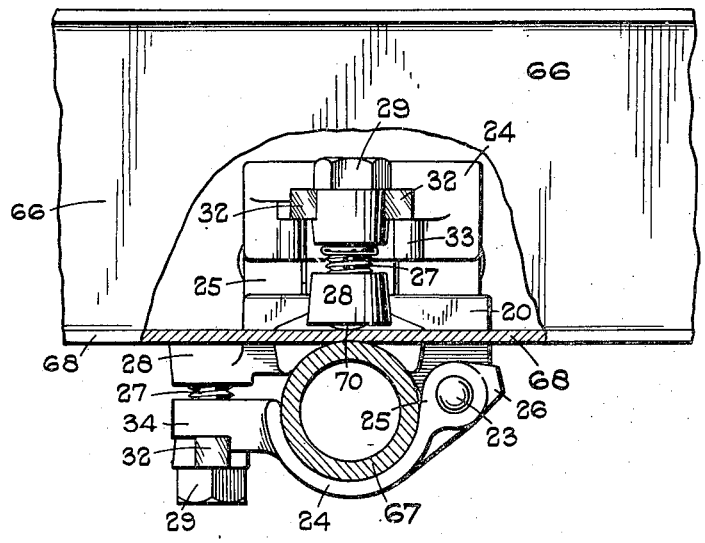
Figure 19 is an end elevation of this same modified application.

In Figures 18 and 19 there is shown a further application of the invention by which the clamp illustrated in Figures 1 to 4 may be employed for securing a scaffolding member to a beam or girder 66 conveniently of I section, and in this modified application the scaffolding member indicated at 67 is secured so that it is in abutment with the underside of the lower flanges 68 of the beam by disposing the clamp in a position in which one of the caps 24 is transverse to the beam and the central block 20 is in abutment with the adjacent end 69 of the beam flange 68 in which position the scaffolding member 67 is secured by the said cap 24 so that it extends transversely of the beam.

The scaffolding clamp is then secured in position on the beam by screwing the bolt of the other cap until its free end 70 engages the upper face of the lower beam flange 68, so that the scaffolding member 67 is forced into close engagement with the underside of the beam flange 68 and clamped securely to the beam.

With this application of the invention, the other cap of the scaffolding clamp is not used for clamping purposes only, a single scaffolding member being gripped by the clamp.

With any of the above described applications, a scaffolding clamp provided with clamping means in accordance with the present invention possesses the advantage that by providing a locking member in the manner described, as compared with existing constructions, in which no locking member is employed, there is no necessity to remove the locking bolt during clamping or release, while only a very limited unscrewing or screwing up movement of the bolt is necessary, so that clamping or release can be effected in a very short time.

Further, as there is no necessity for the bolt to be removed there is no likelihood of it being dropped by the operator and becoming damaged or even lost.

Again, by providing the clamping means with a locking member in the manner described, there is no need to employ the comparatively expensive construction in which a hinged locking bolt is used, such construction involving the disadvantages hereinbefore stated, which are obviated with the present construction.

Further, by providing the locking member with arms or other projections which are adapted to engage flanges on opposite sides of the locking bolt in the manner described, during clamping and when the scaffolding member is clamped in position, the locking bolt is subject to a longitudinal force only, no appreciable force or pressure being applied to the bolt in a direction transverse to its length so that the bolt is not likely to become bent or even wedged in relation to its socket, and damage to the bolt with its consequent inconvenience is avoided.

A further advantage of the above described construction is that by providing the locking member with a pair of arms disposed at opposite sides thereof, the locking member can readily be gripped by the operator so that it can be turned readily from the release to the clamping position and vice versa.

What I claim then is:

1. In a scaffolding clamp for connecting together in end to end relationship a pair of scaffolding members, the ends of which are open, said clamping means comprising a bolt adapted to be screwed onto one jaw of the clamp, a pair of spaced parallel abutments associated with the other jaw of the clamp, said other jaw being adapted for movement in relation to said first jaw to bring said abutments substantially axially of said bolt into a position in which they are on diametrically opposite sides of said bolt, a locking member mounted pivotally on said bolt, said locking member having a pair of lugs disposed at diametrically opposite sides of said bolt, said locking member being adapted to pivot on said bolt from a clamping position to a release position in which said jaws can move relatively to one another, and the lugs on said locking member being adapted in said clamping position to engage the spaced abutments on the jaw and transmit clamping pressure thereto in a plane extending through the axis of the bolt so that the stress under which said bolt is placed is uniform and longitudinal to the axis of the bolt.

2. In a scaffolding clamp for connecting together in end to end relationship a pair of scaffolding members, the ends of which are open, clamping means comprising a bolt adapted to be screwed onto one jaw of the clamp, a pair of spaced parallel abutments associated with the other jaw of the clamp, said other jaw being adapted for movement in relation to said first jaw to bring said abutments substantially axially of said bolt into a position in which they are on diametrically opposite sides of said bolt, a locking member mounted pivotally on said bolt, means for locating said locking member against longitudinal movement in relation to said bolt, said locking member having a pair of lugs disposed at diametrically opposite sides of said bolt, said locking member being adapted to pivot on said bolt from a clamping position to a release position in which said jaws can move relatively to one another, and said locking member in said clamping position being located between the spaced parallel abutments on the jaw with the lugs on the locking member engaging said jaw abutments on opposite sides of said bolt to transmit substantially uniform clamping pressure thereto in a plane extending through the axis of the bolt and parallel to the length of the jaw.

3. A scaffolding clamp comprising a pair of jaws connected together pivotally for movement towards and away from each other, said jaws being adapted releasably to engage a scaffolding member, clamping means for securing said jaws in gripping engagement with said scaffolding member, said clamping means comprising a bolt adapted to be screwed onto one jaw of the clamp substantially in the direction of relative movement of said jaws, a forked portion on the other jaw forming a pair of spaced abutments adapted for disposition on diametrically opposite sides of said bolt, a locking member mounted pivotally on said bolt, said locking member having a pair of arms disposed laterally at diametrically opposite sides of said bolt, said locking member being adapted to pivot on said bolt from a clamping position to a release position in which said jaws can move relatively to one another, and said locking member in the clamping position being located in said forked portion with the arms on said locking member engaging both abutments forming the sides of said forked portion so as to transmit clamping pressure in a plane extending through the axis of the bolt so that said bolt is subject to uniform tensile stress.

4. A scaffolding clamp comprising a pair of jaws connected together pivotally for movement towards and away from each other, said jaws being adapted releasably to engage a scaffolding member, a flange on one of said jaws remote from the pivot thereof, a forked portion on said flange forming a pair of spaced parallel abutments, a clamping bolt adapted to be screwed onto the other of said jaws substantially in the direction of relative movement of said jaws, a locking member mounted pivotally on said bolt, said locking member having a pair of radially projecting lugs disposed at diametrically opposite sides of said bolt, said locking member being adapted to pivot on said bolt from a release position to a clamping position, and in said clamping position being disposed in said forked portion with the lugs on said locking member engaging both abutments forming the sides of said forked portion so as to transmit uniform clamping pressure substantially longitudinal of the bolt.

5. A scaffolding clamp for connecting a pair of scaffolding members together, comprising a central block adapted for disposition between said members, said block having at opposite sides thereof jaw portions adapted each to engage one of said scaffolding members, caps adapted partially to embrace said members disposed at opposite sides of said block and pivoted thereto for movement towards and away from said block, said caps being adapted each to co-operate with one of said jaw portions in gripping said scaffolding members, clamping means for securing each of said caps in gripping engagement with the corresponding scaffolding member, said clamping means including on each cap a pair of spaced abutments on the end of the cap remote from the pivot thereof, a pair of bolts screwed on to said block at opposite sides thereof and adapted each to extend between said spaced abutments substantially in the direction of movement of the corresponding cap in relation to the block, a locking member mounted pivotally on each of said bolts, each locking member having a pair of radially projecting abutments disposed at diametrically opposite sides of the bolt on which it is pivoted, each locking member being adapted to pivot on the corresponding bolt to a clamping position from a release position in which the caps can pivot freely on the block, and each locking member in said clamping position being located between the pair of spaced abutments on the corresponding cap, with the locking member engaging both of said spaced abutments to apply the clamping pressure on diametrically opposite sides of the bolt uniformly along in a plane extending through the axis of the bolt and parallel to the length of the jaw.

6. A scaffolding clamp comprising a pair of jaws adapted releasably to engage a scaffolding member, a pivot connecting said jaws hingedly at one side thereof, clamping means for connecting said jaws releasably at the other side thereof, said clamping means including a forked portion on one of said jaws forming a pair of spaced abutments, a clamping bolt adapted to screw onto the other of said jaws, a locking member mounted on said bolt, said locking member including a hollow boss through which the bolt passes and a pair of abutments projecting radially from said boss at diametrically opposite positions relative to said bolt, a head on the projecting end of said bolt, said bolt having a channel in its shank below said head, a retaining member in said channel, said locking member being capable of rotation on said bolt between a release position and a clamping position and said locking member in the clamping position being located between said spaced abutments, with the abutments on said locking member engaging both of said spaced abutments to apply the clamping pressure on diametrically opposite sides of the bolt and in a plane extending through the axis of the bolt and parallel to the length of the jaw.

7. A scaffolding clamp for connecting a pair of scaffolding members together in end to end relationship, comprising a pair of arcuate jaws each adapted partially to embrace both of said scaffolding members, said jaws being connected pivotally along one of their edges, clamping means for securing said jaws in gripping engagement with said scaffolding members, said clamping means comprising a bolt adapted to be screwed onto one jaw of the clamp, a pair of abutments associated with the other jaw of the clamp and adapted for disposition on opposite sides of said bolt, a locking member mounted pivotally on said bolt, said locking member having a pair of arms disposed at opposite sides of said bolt, said locking member being adapted to pivot on said bolt from a release position in which said jaws can move relatively to a clamping position, and said locking member arms being adapted in said clamping position to engage said jaw abutments on opposite sides of said bolt and transmit clamping pressure thereto, and subject said bolt substantially to longitudinal force only.

8. A scaffolding clamp for connecting a pair of scaffolding members together in end to end relationship, comprising a pair of arcuate jaws each adapted partially to embrace both of said scaffolding members, each of said jaws having hinge lugs along one of their edges, each of said hinge lugs having a hinge pin opening therein, a hinge pin extending into said openings connecting said jaws together pivotally, hinge lug openings of one of said jaws having a diameter larger than the diameter of the hinge pin therewithin, clamping means for securing said jaws in gripping engagement with said scaffolding members, said clamping means comprising a bolt adapted to be screwed onto one jaw of the clamp, a pair of abutments associated with the other jaw of the clamp and adapted for disposition on opposite sides of said bolt, a locking member mounted pivotally on said bolt, said locking member having a plurality of arms extending laterally therefrom, said locking member being adapted to pivot on said bolt from a release position in which said jaws can move relatively to a clamping position, and said locking member arms being adapted in said clamping position to engage said first mentioned abutments on opposite sides of said bolt and transmit clamping pressure thereto, so as to subject said bolt to substantially uniform tensile stress.

9. A scaffolding clamp for connecting together in end to end relationship a pair of scaffolding members the ends of which are open, said scaffolding clamp comprising a pair of arcuate jaws each adapted partially to embrace both of said scaffolding members, said jaws being connected pivotally along one of their edges, clamping means for securing said jaws in gripping engagement with said scaffolding members, a joint pin adapted to extend into the open ends of said scaffolding members and position said members relatively prior to clamping, and means connecting said joint pin irremovably to said clamp.

10. A scaffolding clamp for connecting together in end to end relationship a pair of scaffolding members the ends of which are open, said scaffolding clamp comprising a pair of arcuate jaws each adapted partially to embrace both of said scaffolding members, a hinge pin connecting said jaws pivotally along one of their edges, clamping means for securing said jaws in gripping engagement with said scaffolding members, a joint pin adapted to extend into the open ends of said scaffolding members and position said members relatively prior to clamping, and said joint pin being mounted pivotally on said hinge pin.

11. A scaffolding clamp for connecting together in end to end relationship a pair of scaffolding members the ends of which are open, said scaffolding clamp comprising a pair of arcuate jaws each adapted partially to embrace both of said scaffolding members, each of said jaws having hinge lugs along one of their edges, a joint pin adapted to extend into the open ends of said scaffolding members and position said members relatively prior to clamping, said joint pin having intermediate its ends a flange adapted to maintain the adjacent ends of said scaffolding members spaced apart, said flange and each of said hinge lugs having a hinge pin opening therein, a hinge pin extending into said openings connecting said jaws and joint pin together pivotally, hinge lug openings of one of said jaws having a diameter larger than the diameter of the hinge pin therewithin, and clamping means for securing said jaws in gripping engagement with said scaffolding members.

12. A scaffolding clamp for connecting together in end to end relationship a pair of scaffolding members the ends of which are open, said scaffolding clamp comprising a pair of arcuate jaws each adapted partially to embrace both of said scaffolding members, a hinge pin connecting said jaws pivotally along one of their edges, a joint pin adapted to extend into the open ends of said scaffolding members and position said members relatively prior to clamping, said joint pin being mounted pivotally on said hinge pin, clamping means for securing said jaws in gripping engagement with said scaffolding members, said clamping means comprising a bolt adapted to be screwed onto one jaw of the clamp, a pair of abutments associated with the other jaw of the clamp and adapted for disposition on opposite sides of said bolt, a locking member mounted pivotally on said bolt, said locking member having a pair of abutments disposed at opposite sides of said bolt, said locking member being adapted to pivot on said bolt from a release position in which said jaws can move relatively to a clamping position, and said locking member abutments being adapted in said clamping position to engage said first mentioned abutments on opposite sides of said bolt and transmit clamping pressure thereto.

13. A scaffolding clamp for connecting together in end to end relationship a pair of scaffolding members the ends of which are open, said scaffolding clamp comprising a pair of arcuate jaws each adapted partially to embrace both of said scaffolding members, each of said jaws having hinge lugs along one of their edges, a joint pin adapted to extend into the open ends of said scaffolding members and position said members relatively prior to clamping, said joint pin having intermediate its ends a flange adapted to maintain the adjacent ends of said scaffolding members spaced apart, said flange and each of said hinge lugs having a hinge pin opening therein, a hinge pin extending into said openings connecting said jaws and joint pin together pivotally, hinge lug openings of one of said jaws having a diameter larger than the diameter of the hinge pin therewithin, clamping means for securing said jaws in gripping engagement with said scaffolding members, said clamping means comprising a bolt adapted to be screwed onto one jaw of the clamp, a pair of abutments associated with the other jaw of the clamp and adapted for disposition on opposite sides of said bolt, a locking member mounted pivotally on said bolt, said locking member having a pair of abutmens disposed at opposite sides of said bolt, said locking member being adapted to pivot on said bolt from a release position in which said jaws can move relatively to a clamping position, and said locking member abutments being adapted in said clamping position to engage said first mentioned abutments on opposite sides of said bolt and transmit clamping pressure thereto.

14. A scaffolding clamp comprising a pair of jaws adapted releasably to engage a scaffolding member, a pivot connecting said jaws hingedly at one side thereof, clamping means for connecting said jaws releasably at the other side thereof, said clamping means including a forked portion on one of said jaws forming a pair of spaced abutments, a clamping bolt adapted to screw onto the other of said jaws, a locking member mounted on said bolt, said locking member including a hollow boss through which the bolt passes and a pair of abutments projecting radially from said boss at diametrically opposite positions relative to said bolt, a head on the projecting end of said bolt, said bolt having a channel in its shank below said head, a retaining member in said channel, said locking member being located against axial movement on said bolt between said head and said retaining member but being capable of rotation on said bolt between a release position and a clamping position and said locking member in the clamping position being located between said spaced abutments, with the abutments on said locking member engaging both of said spaced abutments to apply the clamping pressure on diametrically opposite sides of the bolt and in a plane extending through the axis of the bolt and parallel to the length of the jaw.

JOHN BURTON.